United States Patent
Diessner

(10) Patent No.: US 11,400,919 B2
(45) Date of Patent: Aug. 2, 2022

(54) VEHICLE VISION SYSTEM WITH AUTONOMOUS PARKING FUNCTION

(71) Applicant: MAGNA ELECTRONICS INC., Auburn Hills, MI (US)

(72) Inventor: Horst D. Diessner, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 27 days.

(21) Appl. No.: 15/929,843

(22) Filed: May 26, 2020

(65) Prior Publication Data

US 2020/0282974 A1 Sep. 10, 2020

Related U.S. Application Data

(63) Continuation of application No. 15/446,218, filed on Mar. 1, 2017, now abandoned.
(Continued)

(51) Int. Cl.
*B60W 30/06* (2006.01)
*B60W 50/14* (2020.01)
(Continued)

(52) U.S. Cl.
CPC ............ *B60W 30/06* (2013.01); *B60W 10/02* (2013.01); *B60W 10/04* (2013.01); *B60W 10/18* (2013.01); *B60W 10/20* (2013.01); *B60W 50/14* (2013.01); *G05D 1/0221* (2013.01); *G05D 1/0246* (2013.01); *B60W 2554/00* (2020.02);
(Continued)

(58) Field of Classification Search
CPC .... B60W 30/06; B60W 30/09; B60W 30/095; B60W 10/02; B60W 10/04; B60W 10/18; B60W 10/20; B60W 50/14; B60W 2550/00; B60W 2550/10; B60W 2550/14; B60W 2550/40; B60W 2600/00; G05D 1/0221; G05D 1/0234; G05D 1/0246; G05D 1/0225; G05D 2201/0213; B60T 2201/10; B62D 15/027; B62D 15/0285; G08G 1/0967;
(Continued)

(56) References Cited

U.S. PATENT DOCUMENTS 5,355,118 A 10/1994 Fukuhara
5,416,478 A 5/1995 Morinaga
(Continued)

*Primary Examiner* — Richard A Goldman
(74) *Attorney, Agent, or Firm* — Honigman LLP

(57) ABSTRACT

A vehicular parking system includes a plurality of exterior viewing cameras, at least one receiver and a control. The control, when the vehicle is located at an entrance of a parking structure, controls the vehicle to autonomously drive the vehicle from the entrance of the parking structure toward a parking location in the parking structure. The parking structure includes a positioning system having a plurality of short range communication devices at known locations at the parking structure. Responsive to communication signals generated by the devices, the control determines the location of the vehicle relative to the known locations and drives the vehicle from the entrance of the parking structure toward the parking location in the parking structure. With the vehicle positioned at the parking location, and responsive at least to image processing by the image processor of captured image data, the control parks the vehicle in the parking location.

22 Claims, 17 Drawing Sheets

Related U.S. Application Data

(60) Provisional application No. 62/302,346, filed on Mar. 2, 2016.

(51) Int. Cl.
    *G05D 1/02*         (2020.01)
    *B60W 10/18*       (2012.01)
    *B60W 10/20*       (2006.01)
    *B60W 10/02*       (2006.01)
    *B60W 10/04*       (2006.01)

(52) U.S. Cl.
    CPC ..... *B60W 2555/00* (2020.02); *B60W 2556/00* (2020.02); *G05D 2201/0213* (2013.01)

(58) Field of Classification Search
    CPC ....... G08G 1/096708; G08G 1/096716; G08G 1/096725; G01C 21/3484
    USPC ........ 701/2, 23, 24, 25, 26, 27, 28, 41, 301; 180/204
    See application file for complete search history.

(56) References Cited

U.S. PATENT DOCUMENTS

| | | |
|---|---|---|
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,670,935 A | 9/1997 | Schofield et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,990,469 A | 11/1999 | Bechtel et al. |
| 5,990,649 A | 11/1999 | Nagao et al. |
| 6,001,486 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,201,642 B1 | 3/2001 | Bos |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,313,454 B1 | 11/2001 | Bos et al. |
| 6,317,057 B1 | 11/2001 | Lee |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,430,303 B1 | 8/2002 | Naoi et al. |
| 6,433,676 B2 | 8/2002 | DeLine et al. |
| 6,442,465 B2 | 8/2002 | Breed et al. |
| 6,476,730 B2 * | 11/2002 | Kakinami .............. B60Q 9/005 340/435 |
| 6,477,464 B2 | 11/2002 | McCarthy et al. |
| 6,483,429 B1 | 11/2002 | Yasui et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,513,252 B1 | 2/2003 | Schierbeek |
| 6,516,664 B2 | 2/2003 | Lynam |
| 6,534,884 B2 | 3/2003 | Marcus et al. |
| 6,539,306 B2 | 3/2003 | Turnbull |
| 6,547,133 B1 | 4/2003 | Devries, Jr. et al. |

(56) References Cited

U.S. PATENT DOCUMENTS

| | | | |
|---|---|---|---|
| 6,553,130 B1 | 4/2003 | Lemelson et al. | |
| 6,574,033 B1 | 6/2003 | Chui et al. | |
| 6,589,625 B1 | 7/2003 | Kothari et al. | |
| 6,593,565 B2 | 7/2003 | Heslin et al. | |
| 6,594,583 B2 | 7/2003 | Ogura et al. | |
| 6,611,610 B1 | 8/2003 | Stam et al. | |
| 6,627,918 B2 | 9/2003 | Getz et al. | |
| 6,636,258 B2 | 10/2003 | Strumolo | |
| 6,648,477 B2 | 11/2003 | Hutzel et al. | |
| 6,650,233 B2 | 11/2003 | DeLine et al. | |
| 6,672,731 B2 | 1/2004 | Schnell et al. | |
| 6,678,056 B2 | 1/2004 | Downs | |
| 6,678,614 B2 | 1/2004 | McCarthy et al. | |
| 6,690,268 B2 | 2/2004 | Schofield et al. | |
| 6,700,605 B1 | 3/2004 | Toyoda et al. | |
| 6,703,925 B2 | 3/2004 | Steffel | |
| 6,704,621 B1 * | 3/2004 | Stein | G01S 11/12 382/104 |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,735,506 B2 | 5/2004 | Breed et al. | |
| 6,744,353 B2 | 6/2004 | Sjonell | |
| 6,757,109 B2 | 6/2004 | Bos | |
| 6,762,867 B2 | 7/2004 | Lippert et al. | |
| 6,795,221 B1 | 9/2004 | Urey | |
| 6,806,452 B2 | 10/2004 | Bos et al. | |
| 6,822,563 B2 | 11/2004 | Bos et al. | |
| 6,823,241 B2 | 11/2004 | Shirato et al. | |
| 6,824,281 B2 | 11/2004 | Schofield et al. | |
| 6,825,880 B2 | 11/2004 | Asahi et al. | |
| 6,847,487 B2 | 1/2005 | Burgner | |
| 6,882,287 B2 | 4/2005 | Schofield | |
| 6,889,161 B2 | 5/2005 | Winner et al. | |
| 6,898,495 B2 | 5/2005 | Tanaka et al. | |
| 6,909,753 B2 | 6/2005 | Meehan et al. | |
| 6,940,423 B2 | 9/2005 | Takagi et al. | |
| 6,946,978 B2 | 9/2005 | Schofield | |
| 6,947,064 B1 | 9/2005 | Hahn et al. | |
| 6,968,736 B2 | 11/2005 | Lynam | |
| 6,975,775 B2 | 12/2005 | Rykowski et al. | |
| 7,004,593 B2 | 2/2006 | Weller et al. | |
| 7,004,606 B2 | 2/2006 | Schofield | |
| 7,005,974 B2 | 2/2006 | McMahon et al. | |
| 7,038,577 B2 | 5/2006 | Pawlicki et al. | |
| 7,062,300 B1 | 6/2006 | Kim | |
| 7,065,432 B2 | 6/2006 | Moisel et al. | |
| 7,085,637 B2 | 8/2006 | Breed et al. | |
| 7,092,548 B2 | 8/2006 | Laumeyer et al. | |
| 7,116,246 B2 | 10/2006 | Winter et al. | |
| 7,123,168 B2 | 10/2006 | Schofield | |
| 7,149,613 B2 | 12/2006 | Stam et al. | |
| 7,167,796 B2 | 1/2007 | Taylor et al. | |
| 7,202,776 B2 | 4/2007 | Breed | |
| 7,227,459 B2 | 6/2007 | Bos et al. | |
| 7,227,611 B2 | 6/2007 | Hull et al. | |
| 7,257,486 B2 | 8/2007 | Shimazaki et al. | |
| 7,295,227 B1 | 11/2007 | Asahi et al. | |
| 7,366,595 B1 | 4/2008 | Shimizu et al. | |
| 7,369,940 B2 | 5/2008 | Frank et al. | |
| 7,526,103 B2 | 4/2009 | Schofield et al. | |
| 7,598,887 B2 | 10/2009 | Sato et al. | |
| 7,616,781 B2 | 11/2009 | Schofield et al. | |
| 7,619,508 B2 | 11/2009 | Lynam et al. | |
| 7,639,149 B2 | 12/2009 | Katoh | |
| 7,680,570 B2 | 3/2010 | Mori | |
| 7,720,580 B2 | 5/2010 | Higgins-Luthman | |
| 7,914,187 B2 | 3/2011 | Higgins-Luthman et al. | |
| 8,285,479 B2 * | 10/2012 | Kawabata | B62D 15/0285 701/301 |
| 8,451,107 B2 | 5/2013 | Lu et al. | |
| 8,874,317 B2 | 10/2014 | Marczok et al. | |
| 9,002,581 B2 * | 4/2015 | Castaneda | B62D 6/001 701/41 |
| 9,739,226 B2 * | 8/2017 | Elwart | B60K 28/04 |
| 9,944,282 B1 * | 4/2018 | Fields | B60K 35/00 |
| 10,133,273 B2 * | 11/2018 | Linke | G05D 1/0221 |
| 2002/0113873 A1 | 8/2002 | Williams | |
| 2003/0080877 A1 | 5/2003 | Takagi et al. | |
| 2003/0137586 A1 | 7/2003 | Lewellen | |
| 2003/0222982 A1 | 12/2003 | Hamdan et al. | |
| 2004/0130464 A1 | 7/2004 | Schindler et al. | |
| 2004/0153243 A1 | 8/2004 | Shimazaki et al. | |
| 2005/0171654 A1 * | 8/2005 | Nichols | G08G 5/065 701/15 |
| 2005/0203704 A1 | 9/2005 | Frank et al. | |
| 2005/0285758 A1 * | 12/2005 | Matsukawa | B62D 15/0285 340/932.2 |
| 2006/0050018 A1 | 3/2006 | Hutzel et al. | |
| 2006/0091813 A1 | 5/2006 | Stam et al. | |
| 2006/0103727 A1 | 5/2006 | Tseng | |
| 2006/0164230 A1 | 7/2006 | DeWind et al. | |
| 2006/0250501 A1 | 11/2006 | Wildmann et al. | |
| 2006/0287825 A1 | 12/2006 | Shimizu et al. | |
| 2006/0287826 A1 | 12/2006 | Shimizu et al. | |
| 2007/0021881 A1 | 1/2007 | Mori | |
| 2007/0104476 A1 | 5/2007 | Yasutomi et al. | |
| 2007/0198145 A1 * | 8/2007 | Norris | G05D 1/0061 701/23 |
| 2008/0032706 A1 * | 2/2008 | Sheynblat | G01S 19/42 455/456.1 |
| 2009/0113509 A1 | 4/2009 | Tseng et al. | |
| 2010/0013670 A1 * | 1/2010 | Hueppauff | B62D 15/028 340/932.2 |
| 2010/0045797 A1 | 2/2010 | Schofield et al. | |
| 2010/0222925 A1 * | 9/2010 | Anezaki | G05D 1/0253 700/253 |
| 2010/0235053 A1 | 9/2010 | Iwakiri et al. | |
| 2010/0286872 A1 | 11/2010 | Endo et al. | |
| 2011/0080304 A1 * | 4/2011 | Toledo | G08G 1/165 340/932.2 |
| 2012/0239224 A1 * | 9/2012 | McCabe | B66F 9/063 701/2 |
| 2012/0239238 A1 * | 9/2012 | Harvey | B66F 9/063 701/25 |
| 2013/0046441 A1 | 2/2013 | Marczok et al. | |
| 2013/0116859 A1 | 5/2013 | Ihlenburg et al. | |
| 2013/0231824 A1 * | 9/2013 | Wilson | G01C 21/3415 701/26 |
| 2013/0278769 A1 * | 10/2013 | Nix | G08G 1/161 348/148 |
| 2014/0052336 A1 * | 2/2014 | Moshchuk | B62D 15/0285 701/41 |
| 2014/0067206 A1 | 3/2014 | Pflug | |
| 2014/0180523 A1 * | 6/2014 | Reichel | B62D 15/0285 701/23 |
| 2014/0267608 A1 * | 9/2014 | Dhome | G06T 7/80 348/43 |
| 2014/0270345 A1 * | 9/2014 | Gantman | G01S 5/16 382/103 |
| 2014/0343830 A1 * | 11/2014 | Elwart | F02N 11/0818 701/112 |
| 2014/0354811 A1 * | 12/2014 | Weber | B60R 1/00 348/148 |
| 2014/0365032 A1 * | 12/2014 | Park | G07C 9/00182 701/2 |
| 2014/0375476 A1 | 12/2014 | Johnson et al. | |
| 2015/0022664 A1 | 1/2015 | Pflug et al. | |
| 2015/0042808 A1 | 2/2015 | Pflug | |
| 2015/0081174 A1 | 3/2015 | Marczok et al. | |
| 2015/0124096 A1 | 5/2015 | Koravadi | |
| 2015/0158499 A1 | 6/2015 | Koravadi | |
| 2015/0203111 A1 * | 7/2015 | Bonnet | B62D 15/027 701/25 |
| 2015/0217763 A1 * | 8/2015 | Reichel | G01S 19/13 701/23 |
| 2015/0226146 A1 * | 8/2015 | Elwart | B60W 30/06 701/49 |
| 2015/0241241 A1 * | 8/2015 | Cudak | G06Q 30/0284 701/408 |
| 2015/0251599 A1 | 9/2015 | Koravadi | |
| 2015/0344028 A1 | 12/2015 | Gieseke et al. | |

(56) References Cited

U.S. PATENT DOCUMENTS

| | | | |
|---|---|---|---|
| 2015/0346727 A1* | 12/2015 | Ramanujam | B62D 15/0285 |
| | | | 701/23 |
| 2016/0096477 A1 | 4/2016 | Biemer | |
| 2016/0115702 A1* | 4/2016 | Nordbruch | G05D 1/0297 |
| | | | 701/23 |
| 2016/0162747 A1 | 6/2016 | Singh et al. | |
| 2017/0008490 A1* | 1/2017 | Sako | G07C 9/00571 |
| 2017/0015312 A1 | 1/2017 | Latotzki | |
| 2017/0017848 A1 | 1/2017 | Gupta et al. | |
| 2017/0050672 A1 | 2/2017 | Gieseke et al. | |
| 2017/0083774 A1* | 3/2017 | Solar | B60Q 1/143 |
| 2017/0123423 A1* | 5/2017 | Sako | G05D 1/0088 |
| 2017/0200321 A1* | 7/2017 | Hummel | G06Q 30/0611 |
| 2017/0232891 A1* | 8/2017 | Nordbruch | B60Q 9/002 |
| | | | 701/23 |
| 2017/0247030 A1 | 8/2017 | Rinaldo | |
| 2017/0253237 A1* | 9/2017 | Diessner | B60W 30/06 |
| 2017/0305467 A1* | 10/2017 | Nordbruch | G08G 1/146 |
| 2017/0308095 A1* | 10/2017 | Irion | G05D 1/0282 |
| 2017/0309177 A1* | 10/2017 | Hoffmann | G08G 1/127 |
| 2017/0313305 A1* | 11/2017 | Irion | G08G 1/142 |
| 2017/0313307 A1* | 11/2017 | Nordbruch | G01C 21/20 |
| 2017/0323565 A1* | 11/2017 | Nordbruch | G08G 1/148 |
| 2017/0329331 A1* | 11/2017 | Gao | G05D 1/0221 |
| 2018/0037136 A1* | 2/2018 | Nelson | B60L 53/51 |
| 2018/0056504 A1* | 3/2018 | Ting | B25J 13/085 |
| 2018/0063285 A1* | 3/2018 | Nordbruch | B60R 16/0232 |
| 2018/0194344 A1* | 7/2018 | Wang | G05D 1/0257 |
| 2018/0304887 A1* | 10/2018 | Nordbruch | G08G 1/164 |
| 2018/0315393 A1* | 11/2018 | Goffart | G09G 5/003 |
| 2018/0328750 A1* | 11/2018 | Yun | B62D 15/0285 |
| 2019/0016331 A1* | 1/2019 | Carlson | B60W 30/06 |
| 2019/0016384 A1* | 1/2019 | Carlson | B60W 30/00 |
| 2019/0080482 A1* | 3/2019 | Szabo | G06K 9/6212 |
| 2019/0105960 A1* | 4/2019 | Dudar | G07C 5/0841 |
| 2019/0347934 A1* | 11/2019 | Hase | B60W 60/0025 |

* cited by examiner

VEHICLE VISION SYSTEM WITH AUTONOMOUS PARKING FUNCTION

CROSS REFERENCE TO RELATED APPLICATIONS

The present application is a continuation of U.S. patent application Ser. No. 15/446,218, filed Mar. 1, 2017, which claims the filing benefits of U.S. provisional application Ser. No. 62/302,346, filed Mar. 2, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more exterior sensors, such as cameras and/or ultrasonic sensors and/or radar sensors or the like to capture data representative of the vehicle surroundings, and provides an autonomous parking feature that controls the vehicle to park the vehicle at a targeted parking location. The system may provide a home parking function, where the system can record or learn a path for the vehicle to travel from a drop off location (such as by a front door of a house) to a parking location (such as in a garage of the house). The system can then follow the recorded path to park the vehicle after the driver has exited the vehicle at the drop off location. Optionally, the system may provide a valet parking feature, where the system may autonomously control the vehicle to drive the vehicle through a parking structure to a parking space or zone.

These and other objects, advantages, purposes and features of the present invention will become apparent upon review of the following specification in conjunction with the drawings.

DESCRIPTION OF THE PREFERRED EMBODIMENTS

A vehicle vision system and/or parking system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
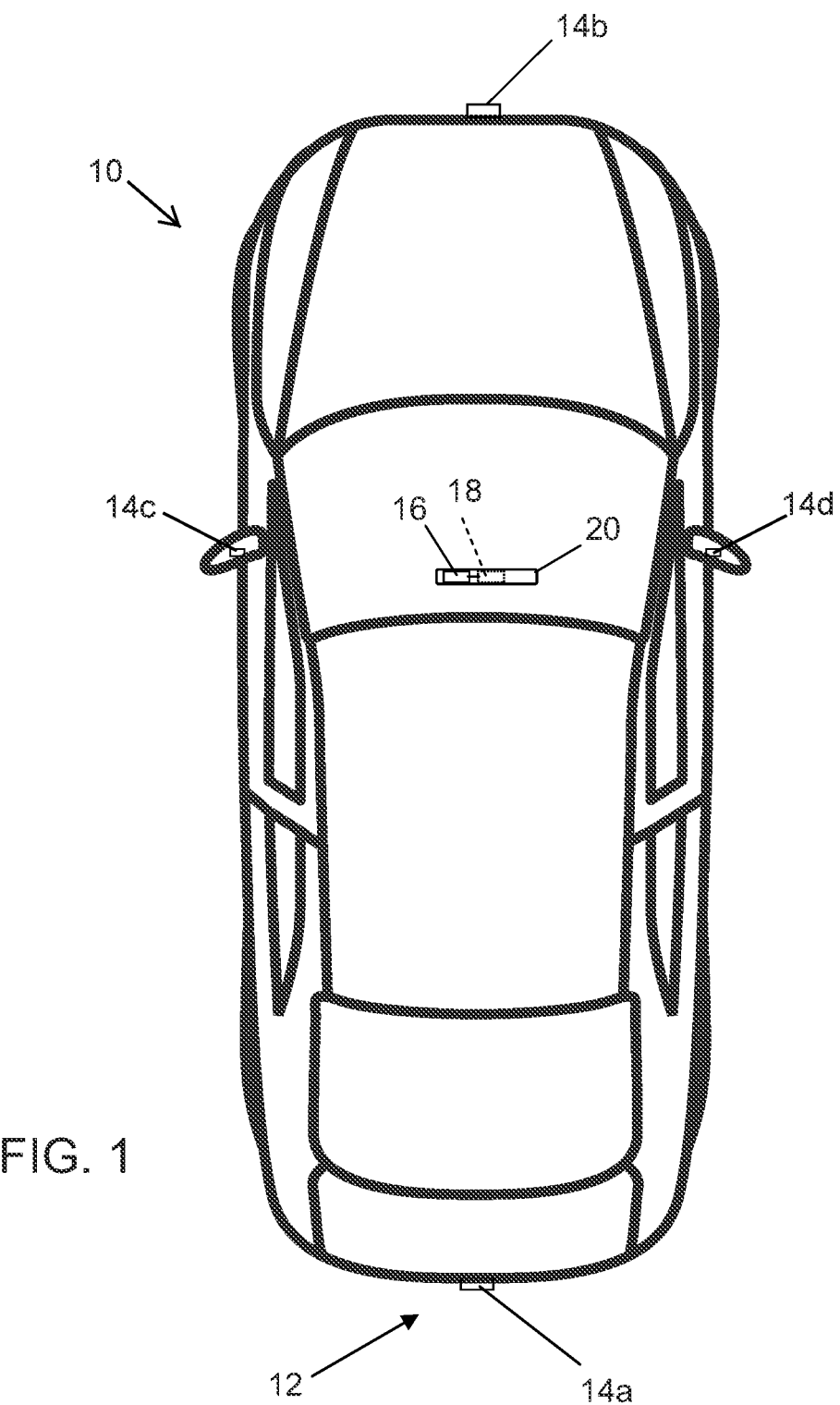
FIG. 1 is a plan view of a vehicle with a vehicle parking system that incorporates cameras and/or other exterior sensors in accordance with the present invention.

Referring now to the drawings and the illustrative embodiments depicted therein, a vehicle 10 includes a vehicle parking system 12 that includes at least one exterior facing sensor or imaging sensor or camera, such as a rearward facing imaging sensor or camera 14a (and the system may optionally include multiple exterior facing imaging sensors or cameras, such as a forward facing camera 14b at the front (or at the windshield) of the vehicle, and a sideward/rearward facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The parking system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The present invention provides an automatic parking system that will "valet park" a vehicle by driving or controlling the vehicle from a location where the driver and passenger may be dropped off to a parking space a relatively short distance away.

Figure 2A:
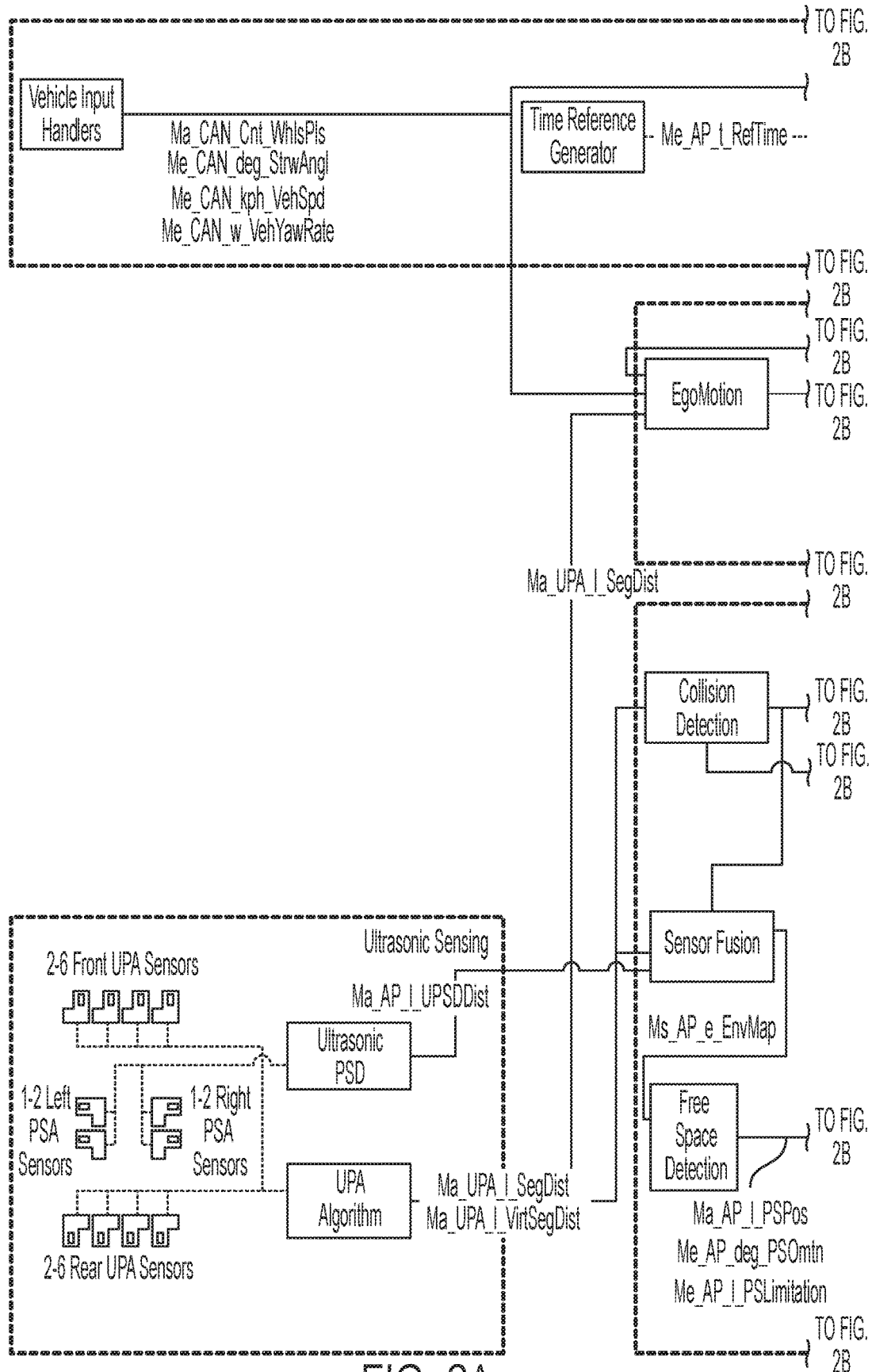
FIGS. 2A and 2B are a schematic showing system architecture of the parking system of the present invention.
Figure 2B:
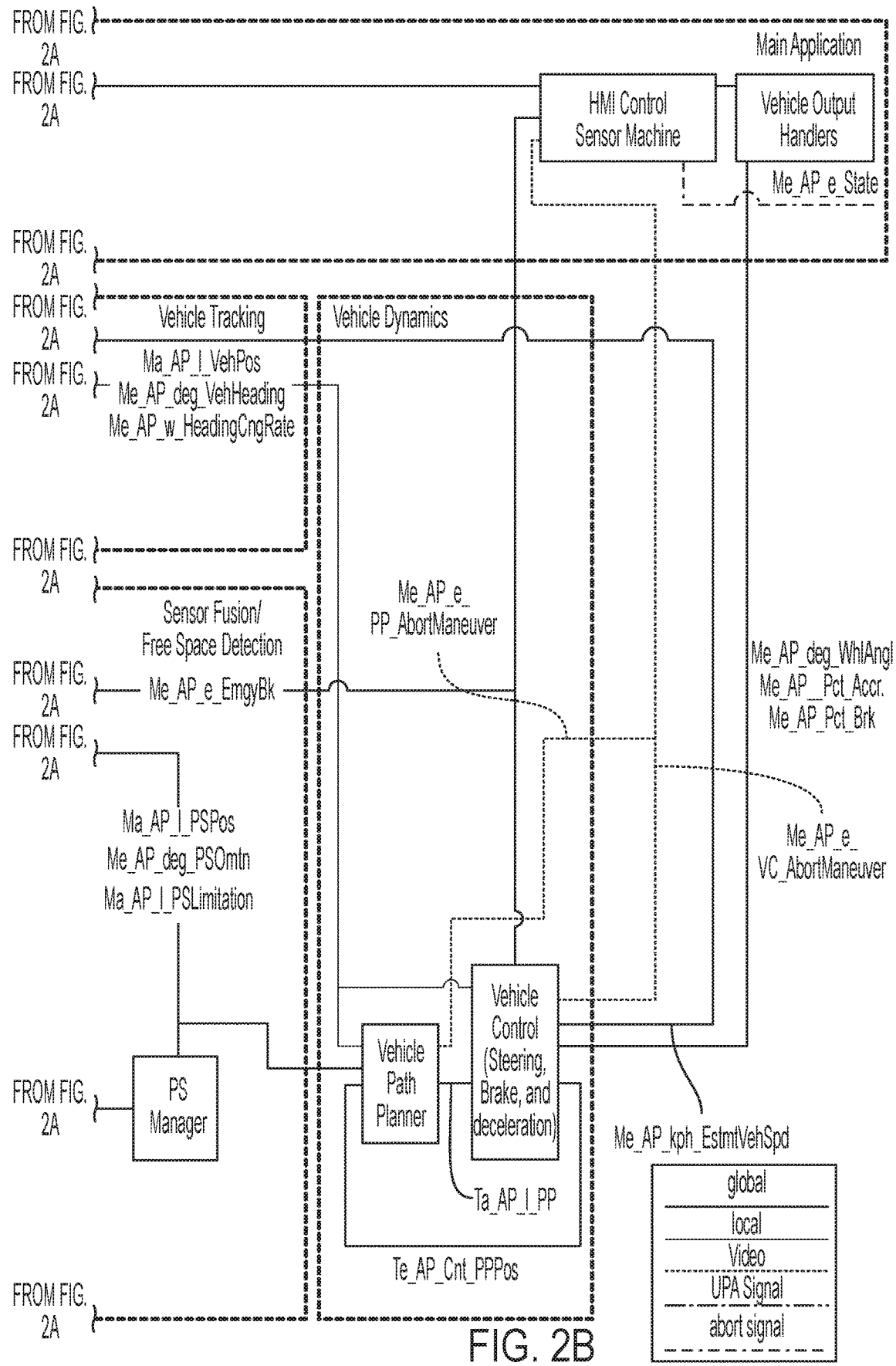

The system includes a plurality of sensors, such as multiple (e.g., about 12) ultrasonic sensors or the like, and an embedded ECU for ultrasonic park assist (UPA) functions and for ultrasonic park space detection (UPSD) functions (see FIG. 2). The system may include CarPC using App-Control for evaluation of UPA and UPSD data for collision detection, free space detection and free space detection manager functions, and may include CarPC using AppControl for CAN based EgoMotion functions. The system may include Microautobox for path planner and vehicle control functions, and may include Microautobox for all application functions such as reference time generator and human-machine interface (HMI) control, and may include Microautobox for communication with the vehicle using FLEXRAY or the like. The embedded ECU, CarPC and Microautobox may communicate using a local CAN bus of the vehicle.

Figure 3A:
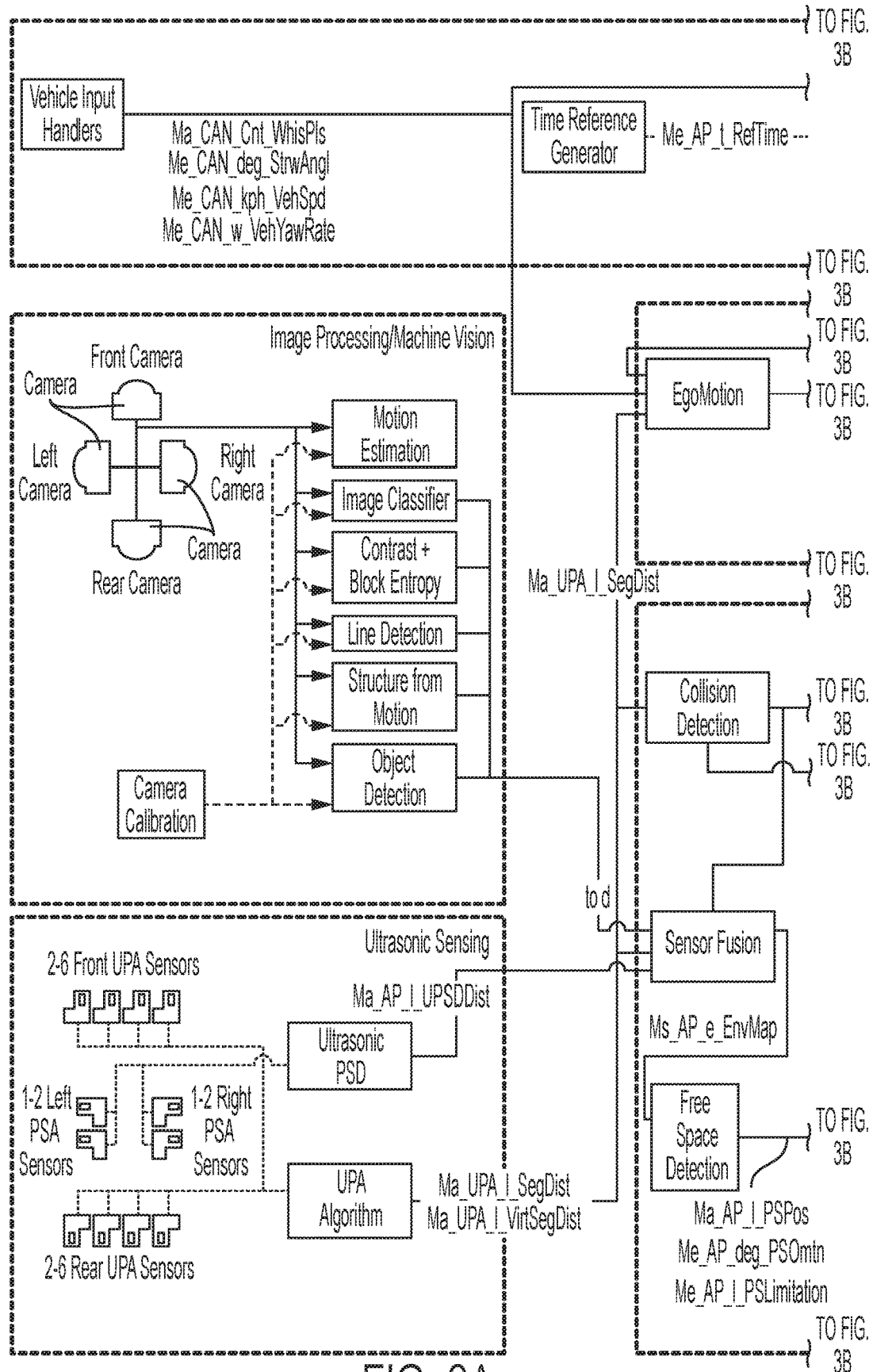
FIGS. 3A and 3B are another schematic showing system architecture of the parking system of the present invention, shown using cameras and image processing.
Figure 3B:
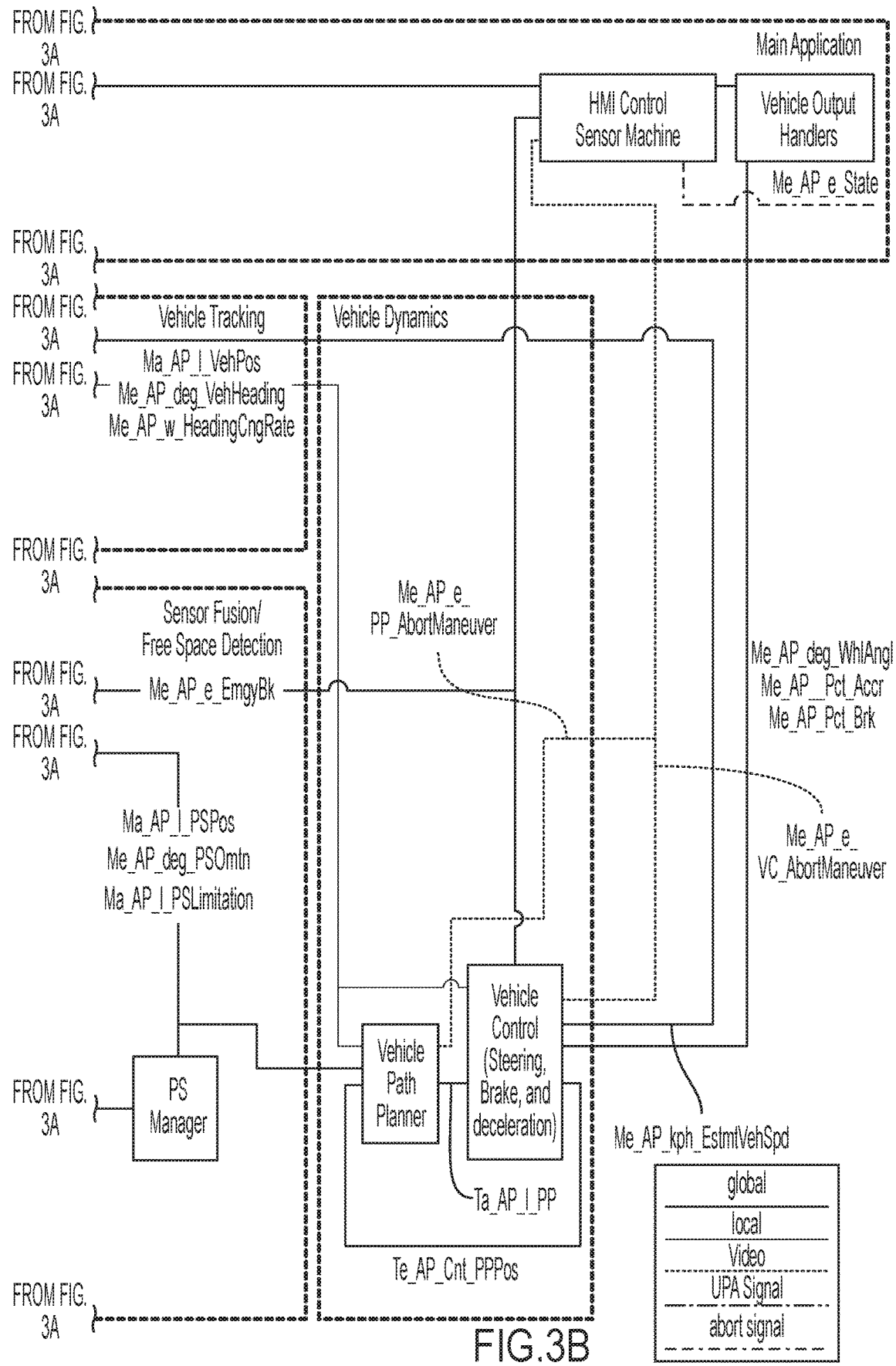

Optionally, the vehicle parking system may include or utilize cameras and machine vision algorithm blocks for surround view systems (SVS) or rear vision camera (RVC) systems and ultrasonic autopark, and may include motion estimation, image classifier, contrast+block entropy, line detection, structure from motion and/or object detection (see FIG. 3).

Figure 4:
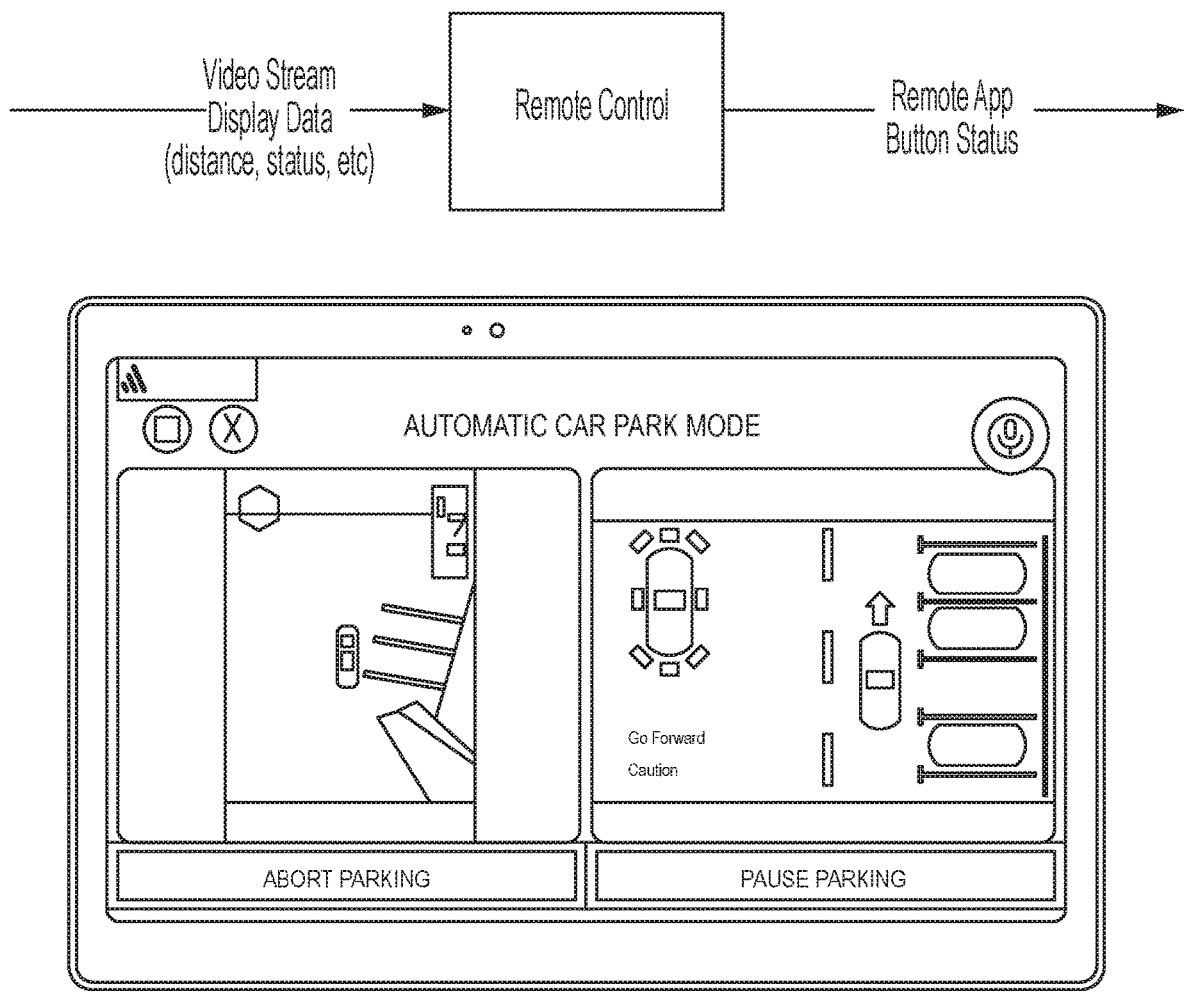
FIG. 4 is a block diagram of a remote control system for controlling the parking system of the present invention, showing a display screen that shows the vehicle as it is being automatically or remotely driven in accordance with the present invention.

Optionally, the parking system of the present invention may use a remote control application running on mobile device (see FIG. 4). The remote control app should allow the user to execute an automated vehicle maneuver by holding down a button while the driver is outside the vehicle, and to maneuver the vehicle manually forward/backward, left/right (like a remote control car). The system may display the system status/obstacle information, distances to objects on the app display and/or images captured by one or more cameras of the vehicle or of the structure where the vehicle is being parked (such as via a vehicle-to-infrastructure communication or the like). The remote control app may be generic in order to support re-use in various projects such as an auto-park system and/or a home zone parking system and/or a trailer backup assist system or the like.

Optionally, the parking system of the present invention may be operable as a home zone parking system that allows a user or driver to get out of the vehicle (such as at a driveway near the front door of the house), whereby the system will autonomously drive the vehicle from the drop off location to the parking location, such as into the garage or the like (see FIGS. 5-8). The system allows for learning or recording of a parking maneuver while the driver is controlling the vehicle (such as responsive to the driver actuating a user input to commence the learning function when the vehicle is at a start or drop off location), for example driving and parking of a vehicle from the entrance door of a house to a designated parking location, and then replaying or re-enacting the parking maneuver without a driver in the vehicle, where the parking system controls the vehicle during the maneuver. For example, the driver, when the vehicle is positioned at a drop off location (such as at or near the door of a house), may actuate the learning feature of the system (via actuation of a first user input when the vehicle is at a start or drop off location), and then the driver may drive the vehicle from the drop off location to the parking location (such as at or in a garage). After the path of travel (between the drop off location and the parking location) has been learned by the system, the next time the driver positions the vehicle at the drop off location, the driver may exit the vehicle and actuate the parking feature (such as via actuation of a second user input of the vehicle when the driver is exiting the vehicle at a start or drop off location or via actuation of a remote device or key fob or the like when the vehicle is at a start or drop off location), whereby the control drives the vehicle (following the previously learned path) from the drop off location to the parking location.

Figure 6:
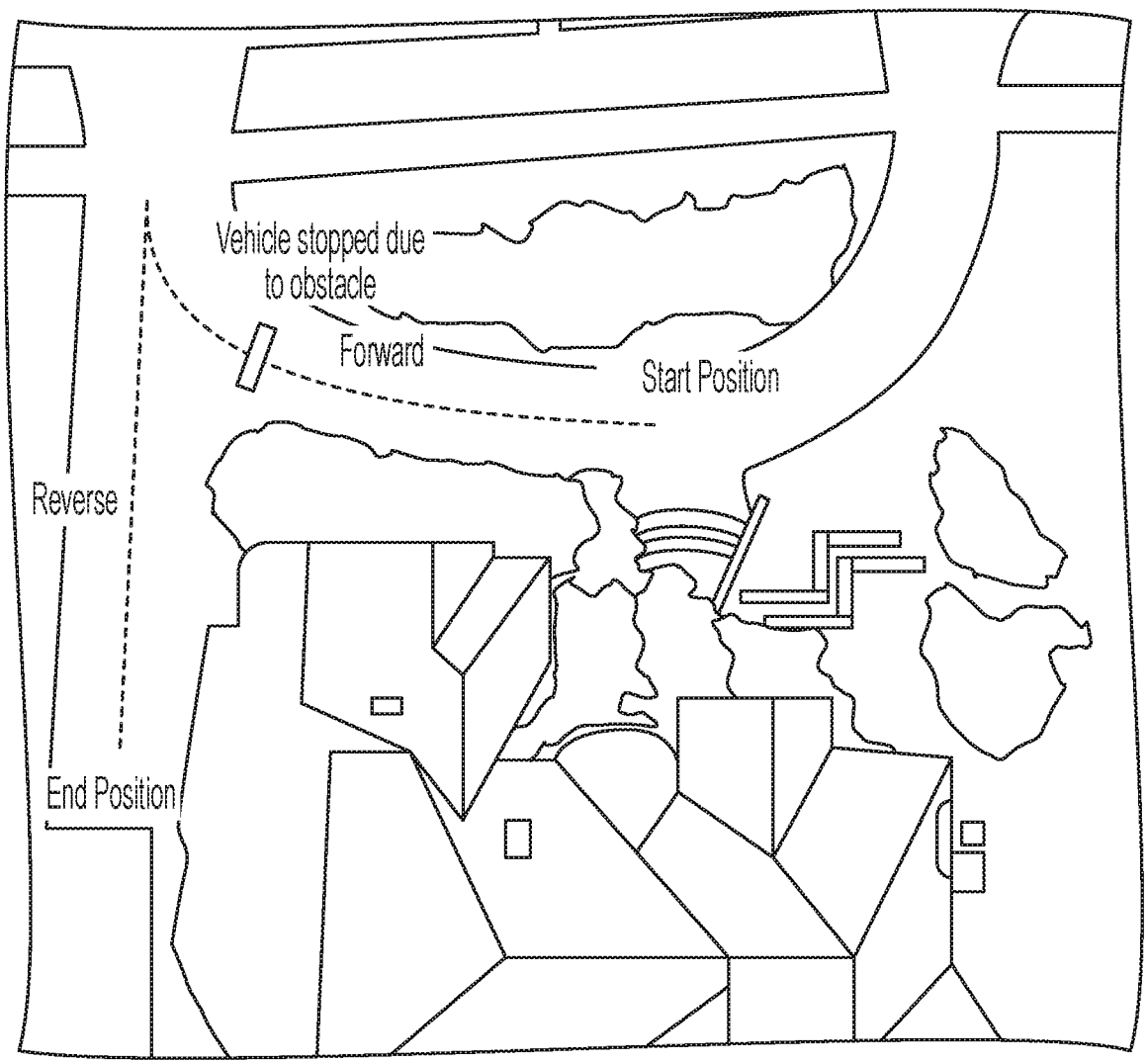
Figure 7:
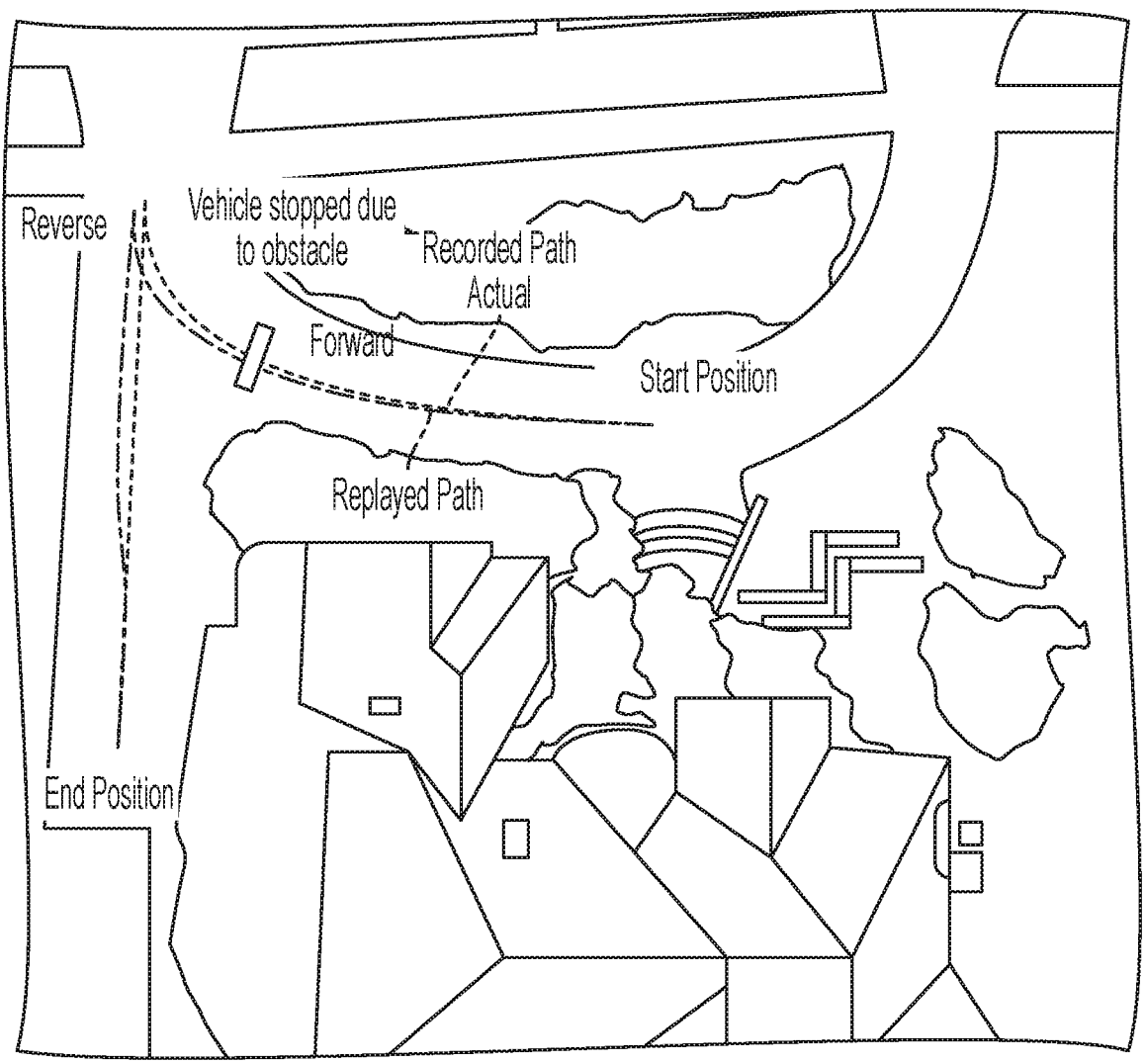
Figure 8:
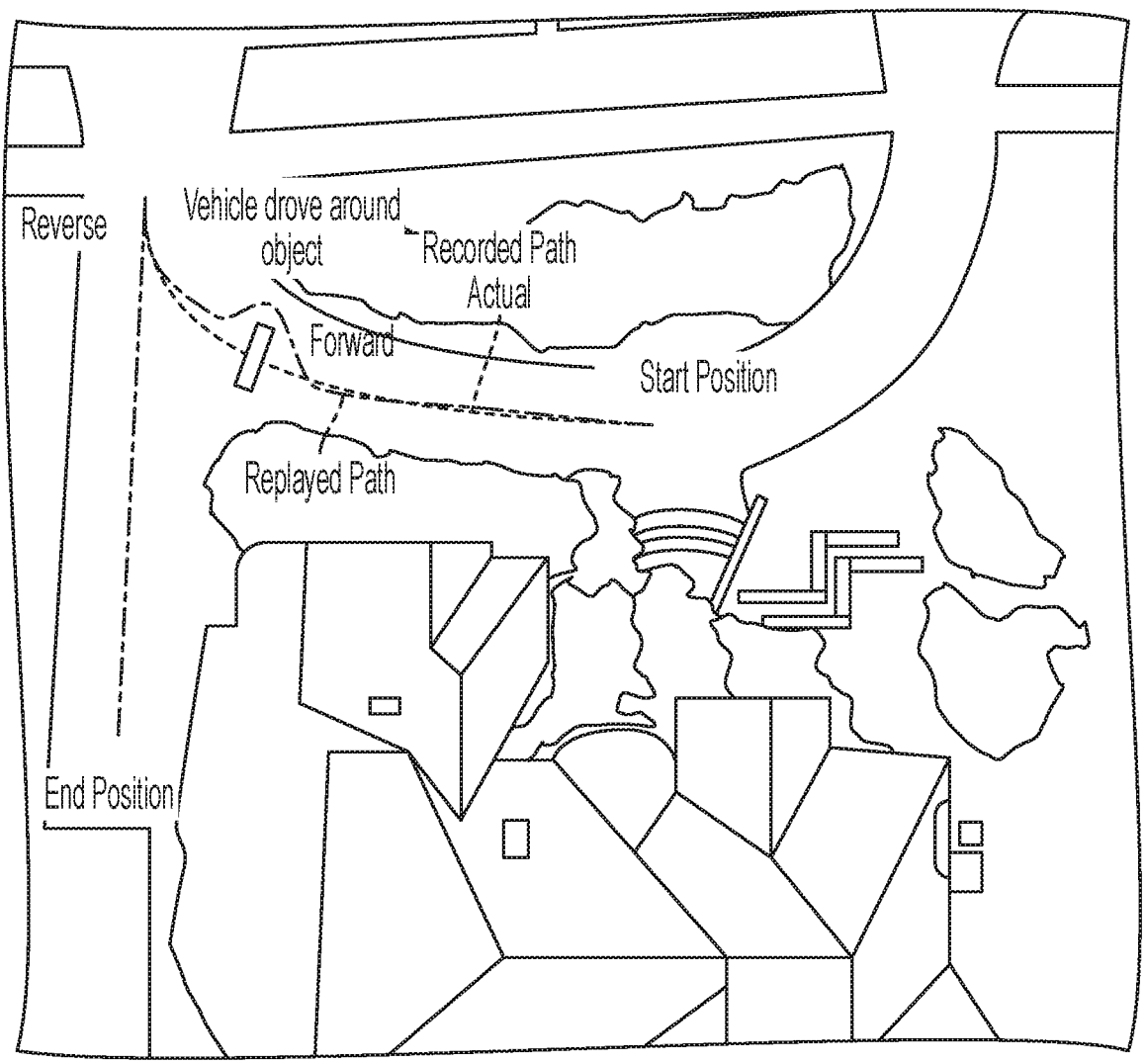

The system utilizes object detection using cameras, UPA (and radar) sensors during the replay or autonomous parking/driving maneuver in order to avoid collisions and control the vehicle along the learned path (see FIGS. 6-8). The system allows for dynamic adjustment of the recorded path in order adjust for variation of the vehicle start position and to reach the exact end position (FIGS. 7 and 8). The system allows for dynamic adjustment of the recorded path in order for the vehicle to maneuver around temporary objects on the path (see FIG. 8).

Figure 5:
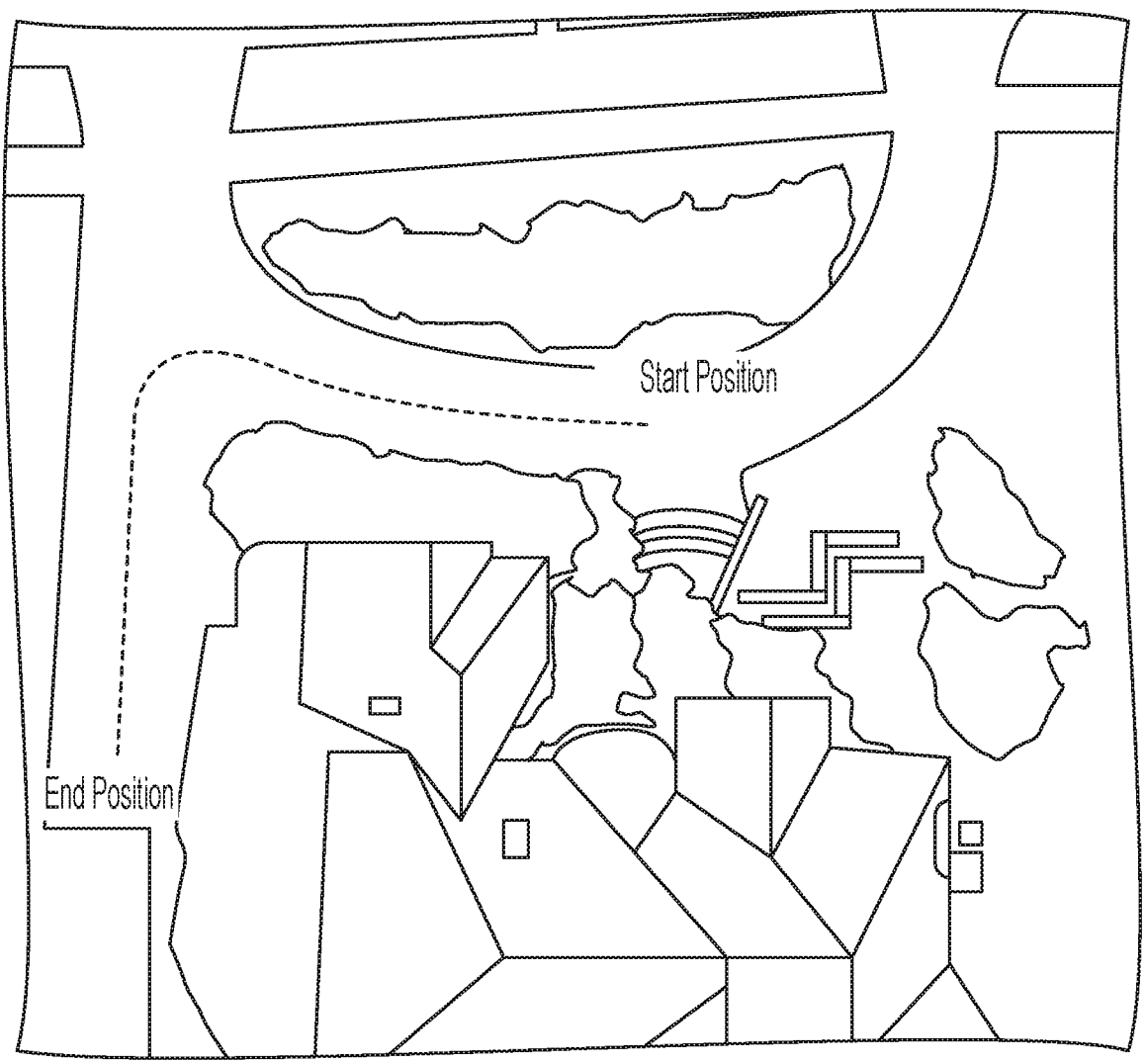
FIGS. 5-8 are plan views of a parking scenario for a home parking system of the present invention.

The system thus may provide a static record and replay without object detection and dynamic path adjustment, such as for a controlled environment, with only static objects present (no other moving vehicles), no pedestrians present (FIG. 5). As shown in FIG. 5, there are no objects present on the path (path is clear), so the system can record path data while the driver is maneuvering the vehicle to the parking position, with the vehicle control limited to maneuvering in one direction (such as only forward maneuvers), with a targeted maximum path length of less than 50 m, preferably less than about 30 m, and a maximum speed of less than about 10 km/h during the recording phase. During static replay of the path data and maneuvering of vehicle on and along the pre-recorded path without using camera/UPA/radar data, the maximum speed may be further reduced, such as less than about 5 km/h during the replay.

The system may provide enhanced control of the vehicle by providing for static record and replay with object detection and without dynamic path adjustment (FIG. 6). As shown in FIG. 6, the vehicle is in a controlled environment, with only static objects present (no other moving vehicles), no pedestrians present. The system may record path data while the driver is maneuvering to the parking position, and may limit the maneuvering to forward and reverse maneuvers (such as 3 sweeps), with a maximum path length of less than 50 m, preferably less than about 30 m, and with a maximum speed of less than about 10 km/h during recording. During controlled parking, the system may perform object detection during the maneuver using cameras/UPA/Radar or the like, and will stop the vehicle if an object is detected in the path of travel of the vehicle. Upon detection of such an object, the system may stop or pause the vehicle maneuver until the object is removed, and then may resume the parking maneuver.

Optionally, the system may provide for static record and replay with object detection and with dynamic path adjustment at the end of the path (FIG. 7). As shown in FIG. 7, the vehicle is in a controlled environment, with only static objects present (no other moving vehicles), no pedestrians present. The system may record path data while the driver is maneuvering to the parking position, and may limit the maneuvering to forward and reverse maneuvers (such as 3 sweeps), with a maximum path length of less than 50 m, preferably less than about 30 m, and with a maximum speed of less than about 10 km/h during recording. The system records landmarks while the driver is maneuvering the vehicle (for example, the system may determine distances to edges of the driveway at certain points, or distances to the garage walls at the final parking position), such as at or near the end of the path (for example, the last five meters or thereabouts of the path). The system may perform object detection during the maneuver using cameras/UPA/Radar and may stop the vehicle if an object is detected on the path of travel of the vehicle, whereby the system may stop or pause the vehicle maneuver until the determined object is removed, and then may resume the maneuver. As shown in FIG. 7, the system may dynamically adjust the maneuver at the end of the path in order to park the vehicle consistently in the same parking position.

Optionally, the system may provide for static record and replay with object detection and with dynamic path adjustment during the entire maneuver (FIG. 8). The system may record landmarks in an environment map while the driver is maneuvering the vehicle (such as, for example, determining and recording distances to edges of the driveway at certain points, or distances to the garage walls at final parking position). The system may perform object detection during the maneuver using cameras/UPA/Radar or the like and may stop the vehicle if an object is detected on the path of travel. If an obstacle is detected, the system may determine if the vehicle can maneuver around the object and may adjust the path if such maneuvering around is possible. The system may stop or pause the maneuver if maneuvering around is not possible, and then may resume the maneuver after the object is removed from the path. The system may compare the recorded environment map and the current environment map and may modify the path in order to move the vehicle on the exact same path, and to compensate for differences in the start position of the vehicle (when the system commences control of the vehicle). The end position shall be the same for every replay.

Optionally, the system of the present invention may provide a valet parking function, where the system may park a vehicle at a public parking space after the driver has dropped himself or herself off at a desired location. Optionally, the desired location may be remote from the parking structure and the system may control the vehicle to follow a learned or predetermined path from the drop off location to an entrance of the parking structure (such as in a similar manner as discussed above). The system allows for autonomous maneuvering of the vehicle from any point inside or in the vicinity of a parking structure (such as at an entrance to the parking structure) to a designated parking location inside the parking structure. The system may include detection of available parking spaces in the vicinity of the designated parking location inside the parking structure using an autopark system that detects available parking spaces (such as by utilizing aspects of the systems described in U.S. Pat. No. 8,874,317 and/or U.S. Publication Nos. US-2017-0015312; US-2015-0158499; US-2015-0251599; US-2015-0124096; US-2015-0344028; US-2014-0375476 and/or US-2013-0116859, which are all hereby incorporated herein by reference in their entireties). The system provides autonomous parking of the vehicle in the detected parking space.

Figure 9:
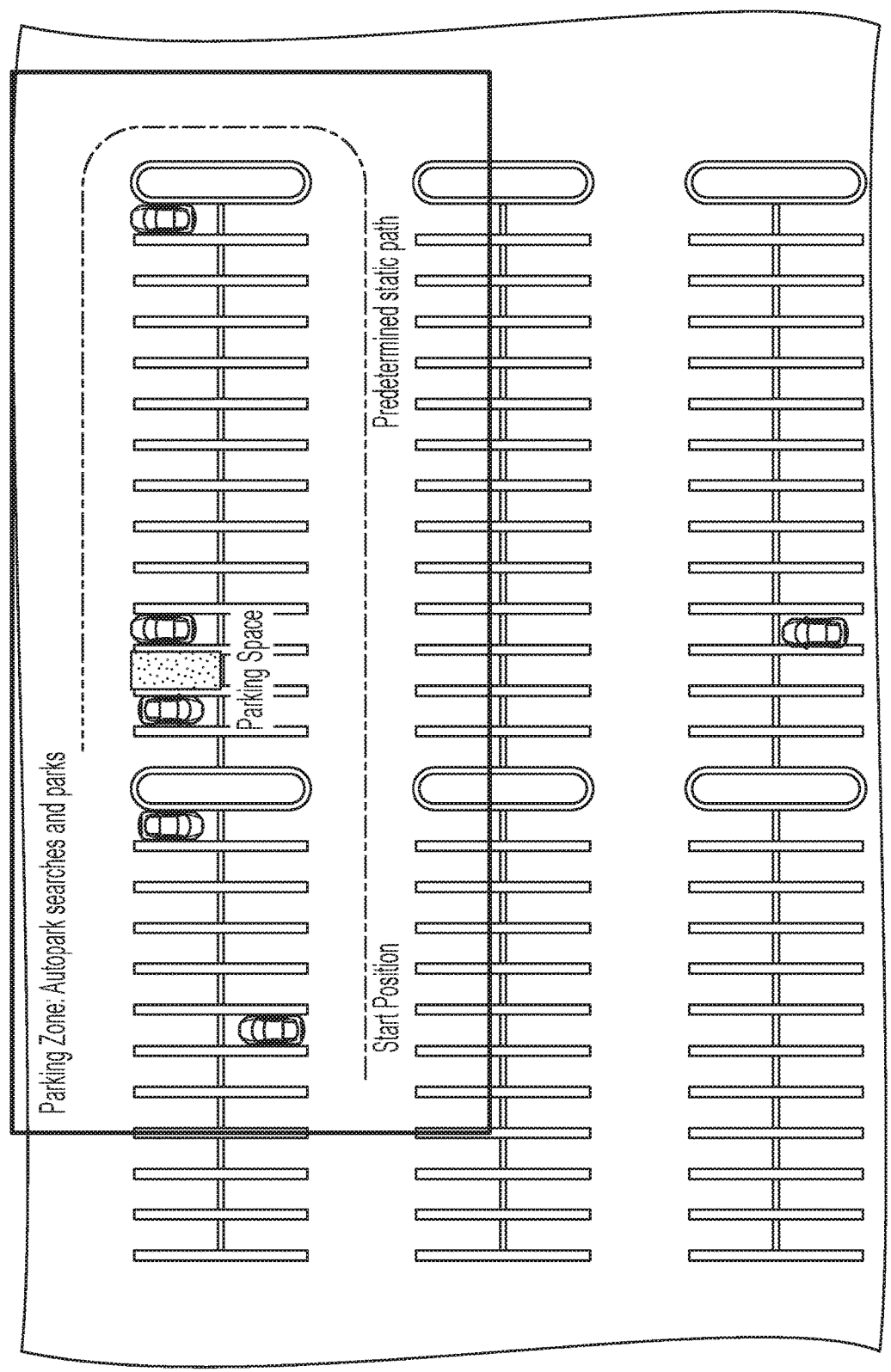
FIGS. 9-12 are plan views of a parking scenario for a valet parking system of the present invention.

The system provides predetermined static path maneuvers from a defined point inside a parking structure to a desired parking zone inside the parking structure on the same floor level followed by automated parking (see FIGS. 9-12). As shown in FIG. 9, the vehicle is in a controlled environment, with only static objects present (no other moving vehicles), no pedestrians present. The system may include detection of static objects (parked vehicles, structural elements, guard rails, posts, and/or the like) using cameras and ultrasonic sensors. The system may abort the maneuver if the system determines that the vehicle would collide with any static object, and may provide emergency braking in case the vehicle would collide with any static object. The system may include a parking structure fingerprinting system to locate the vehicle during maneuver. An autopark system of the vehicle may be activated as the vehicle approaches the end of the predetermined static path (the parking zone) and searches for open parking spaces. The system stops the vehicle when the autopark system finds a parking space, and vehicle control is turned over to the autopark system, which parks the vehicle in the detected parking space.

Figure 10:
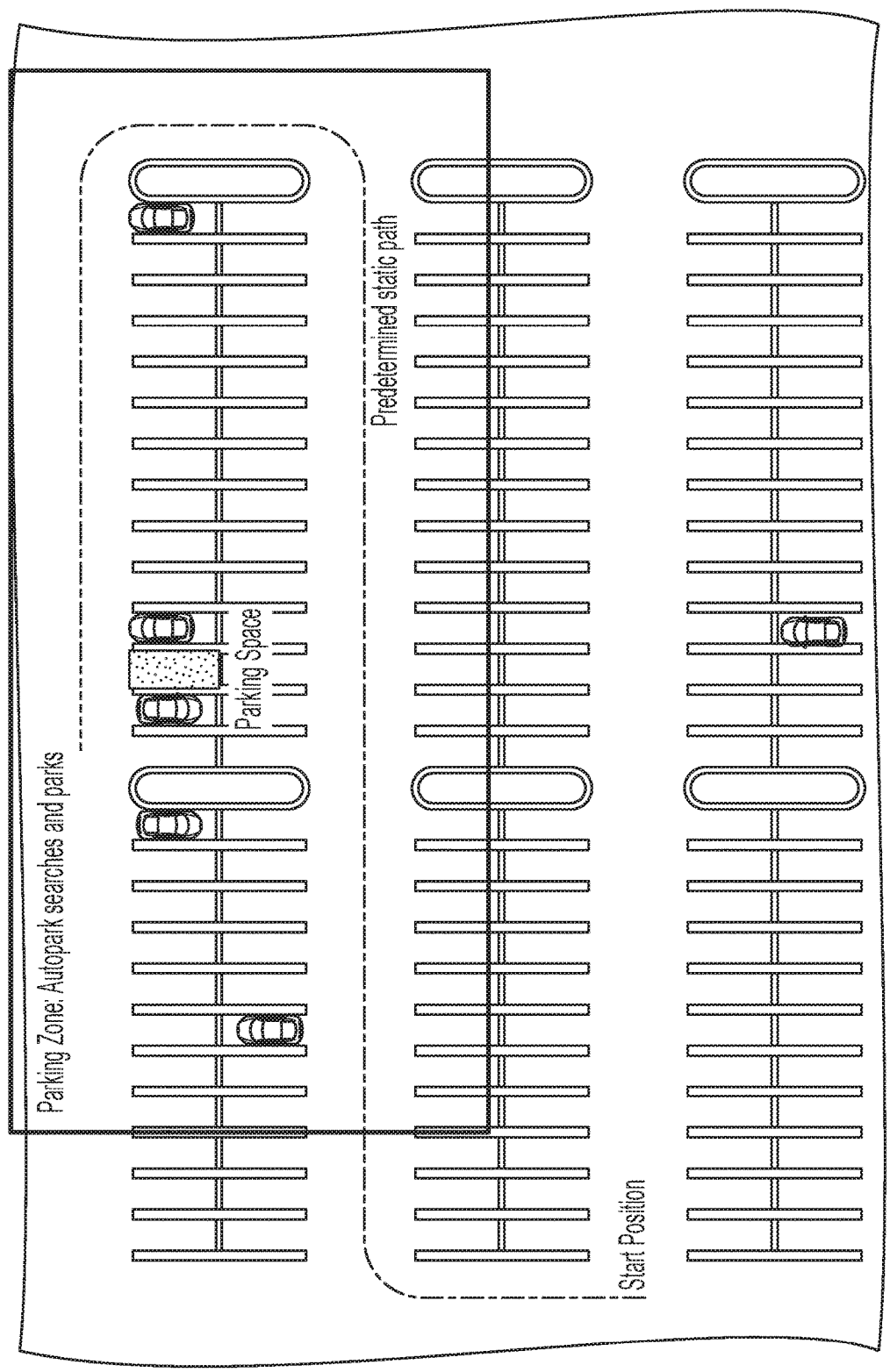

Optionally, the system may perform a predetermined static path maneuver from a defined point outside the parking structure to a desired parking zone inside the parking structure on the same floor level, followed by automated parking (FIG. 10). The system may function in a similar manner as described above, and may use GPS data for maneuvering the vehicle from its location outside the parking structure and then may switch to BLUETOOTH/Wi-Fi fingerprinting for vehicle localization and maneuvering inside the parking structure. The path length outside the structure may be limited to a relatively short distance, such as less than about 100 meters, preferably less than about 50 meters or thereabouts.

Figure 11:
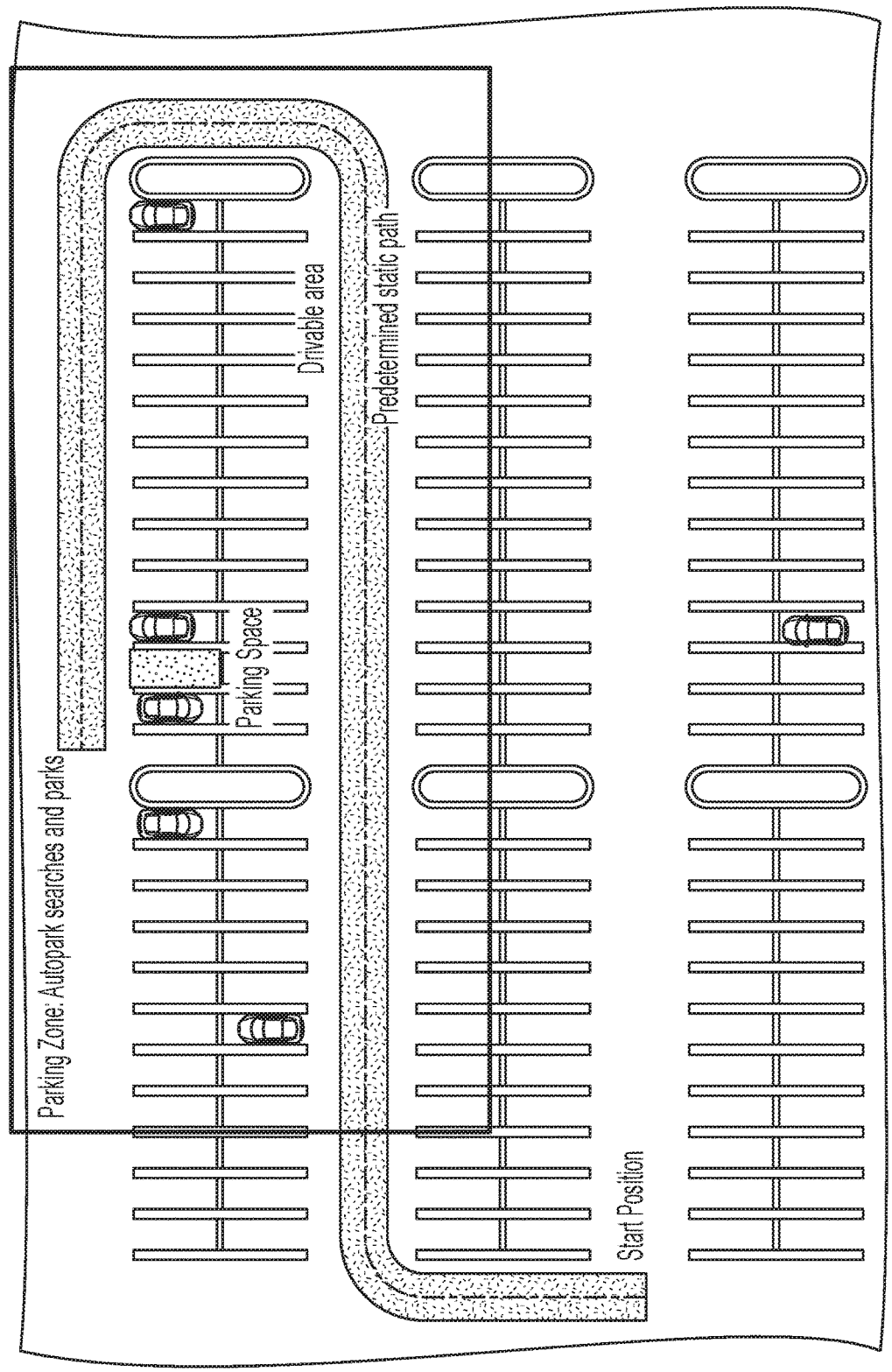

Optionally, the system may perform a predetermined static path maneuver with path adjustments from a defined point outside the parking structure to a desired area inside the parking structure on the same floor level followed by automated parking (FIG. 11). The system may function in a similar manner as described above, and may detect the drivable area while the vehicle is moving using machine vision (and radar sensors). The valet parking system detects objects along the drivable area using ultrasonic sensors and detects lines using line detection algorithms. All of the detected and determined information is entered into an environment map, which is used to adjust or fine tune the predetermined vehicle path in order to maneuver the vehicle centered on the lane, with a constant distance from limits at the right vehicle side.

Figure 12:
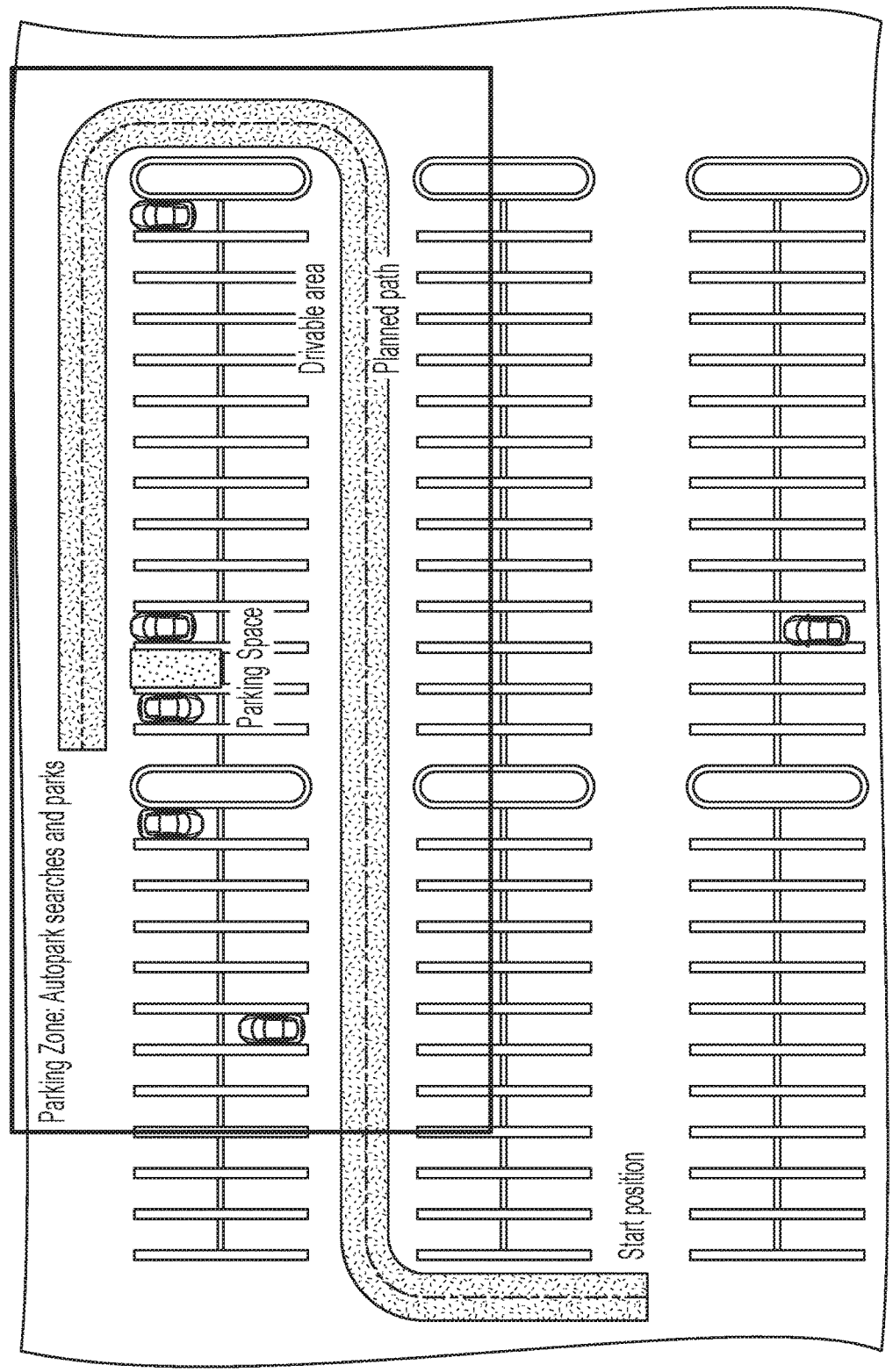

Optionally, the system may perform a planned path maneuver with path adjustments from a defined point outside the parking structure to a desired area inside the parking structure on the same floor level followed by automated parking (FIG. 12). The system defines a layout of the parking structure (parking structure map), and the "smart parking structure" defines the area with free parking spaces (parking zone). The valet parking system plans a path from the current vehicle position outside the parking structure to the parking zone using the parking structure map. This system adds the functionality of path planning to maneuver the vehicle to the parking zone, but the rest of the functionality is similar to that discussed above. Optionally, for example, the system may learn a path from a common drop off location to a location inside a parking structure (such as described above) and then, when the vehicle is autonomously positioned at the location inside the parking structure, the system switches from following the learned path to being responsive to the parking structure layout/zones.

For applications where the system parks the vehicle within a parking structure, the system may utilize an indoor positioning system for underground (or not outside) parking structures. The system may utilize absolute positioning via Bluetooth LE or WLAN or the like and relative positioning with vehicle sensors and optionally a navigation map. The position fingerprinting system or function determines position of the vehicle by comparing the measured signal patterns with previously measured signal patterns in reference points. Optionally, and desirably, the parking garage may have WLAN access points and/or 60 Bluetooth access points and a plurality of fingerprints, whereby the system can determine the vehicle's position within the garage via processing of signals from the access points. The system may combine this information with data captured by vehicle sensors (and processed by a vehicle-based processor) to enhance the determination of the position of the vehicle. The system may use CAN data and Kalman Filtering and/or Particle Filtering to enhance the position or location determination to enhance the vehicle's controlled path of travel when the system is autonomously controlling and parking the vehicle. Optionally, the system may extract map information for further enhancement.

Figure 13:
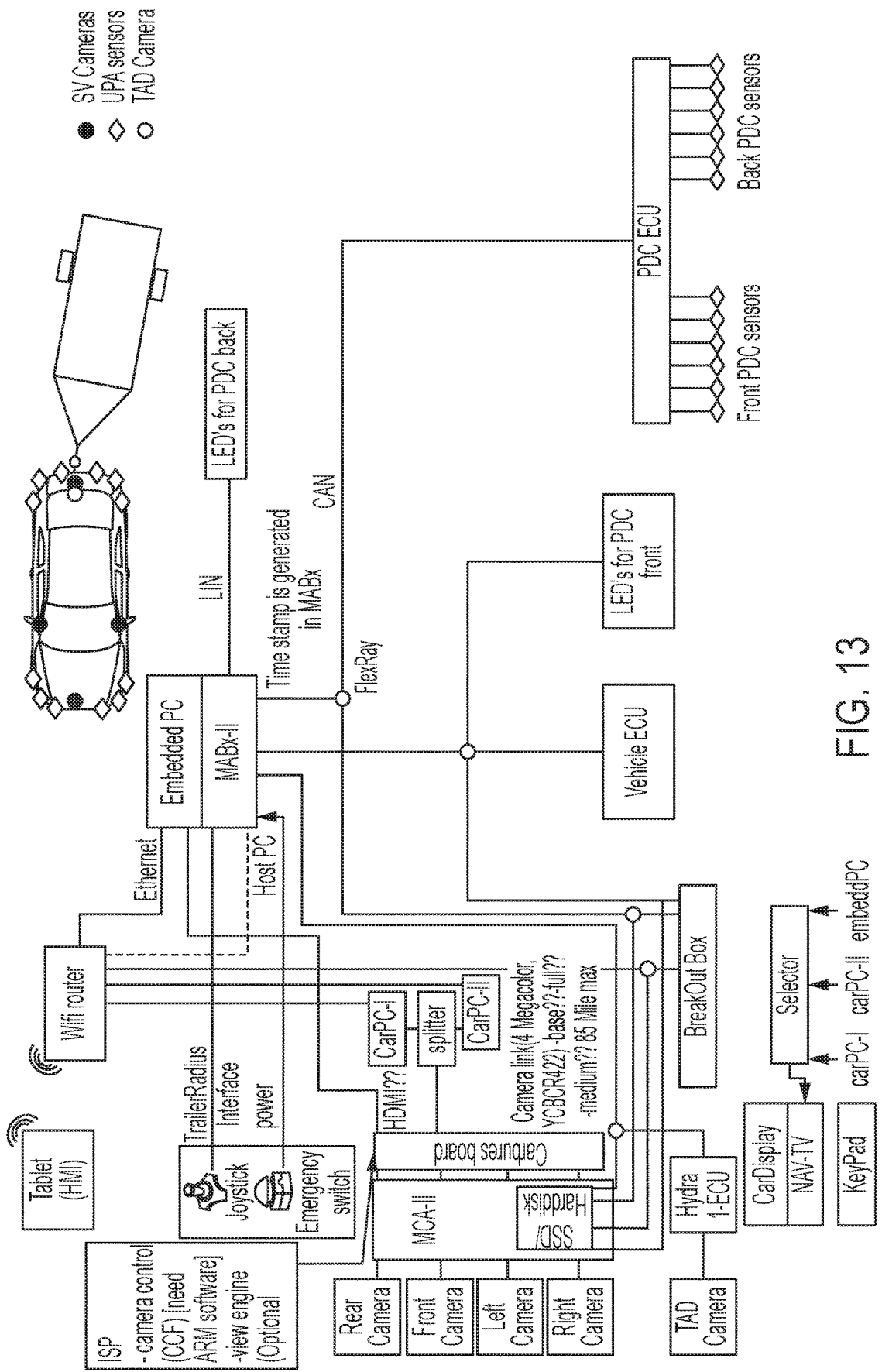
FIG. 13 is a schematic showing system architecture of the parking system of the present invention.

As shown in FIG. 13, the system may be adaptable to park a vehicle pulling a trailer, such as by utilizing various trailer angle detection systems and trailer assist systems of the types described in U.S. Pat. No. 9,085,261 and/or U.S. Publication Nos. US-2017-0050672; US-2015-0002670; US-2014-0160276; US-2012-0265416; US-2014-0085472 and/or US-2015-0217693, which are hereby incorporated herein by reference in their entireties.

Figure 14A:
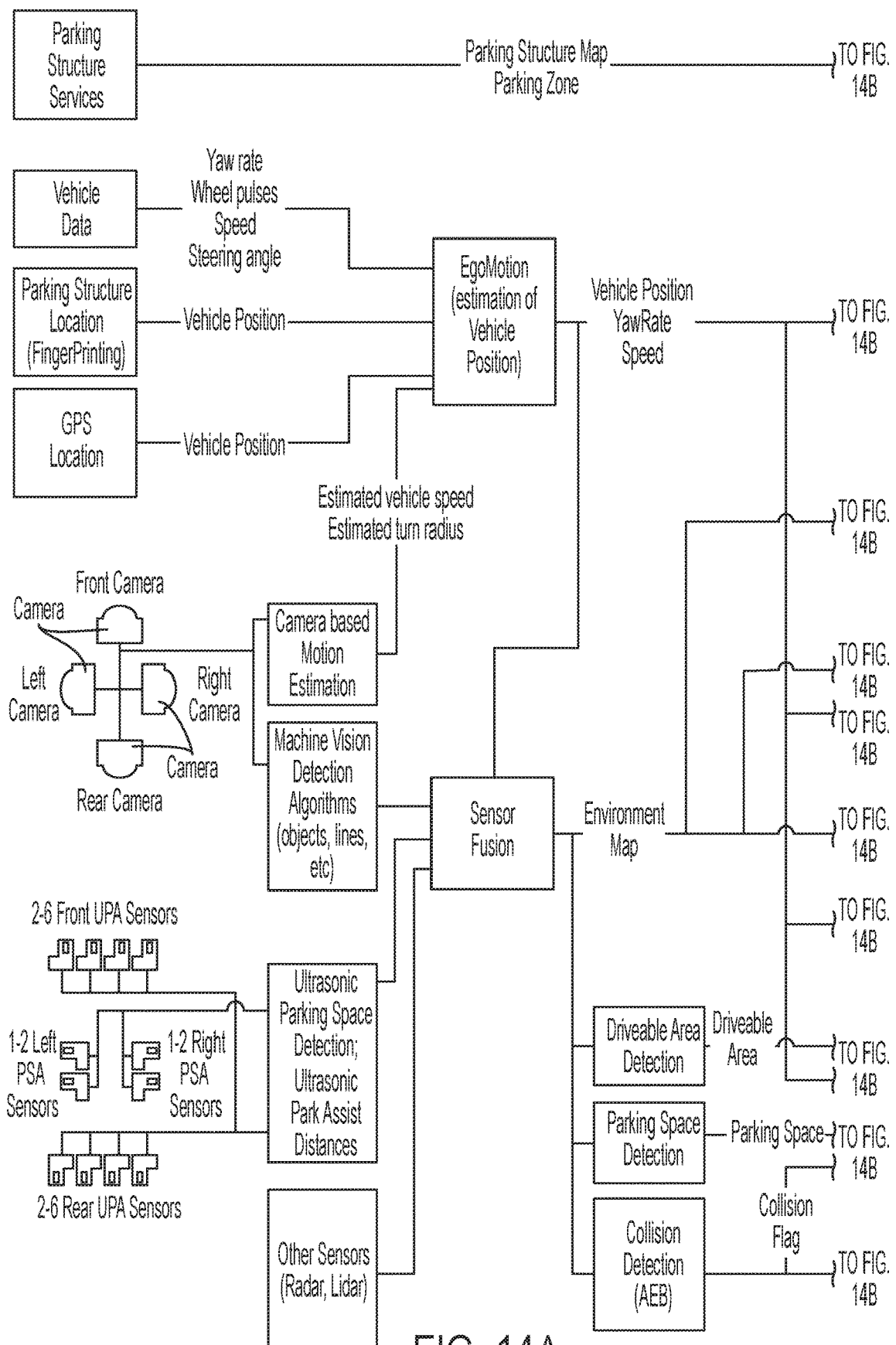
FIGS. 14A and 14B are another schematic showing system architecture of the parking system of the present invention.
Figure 14B:
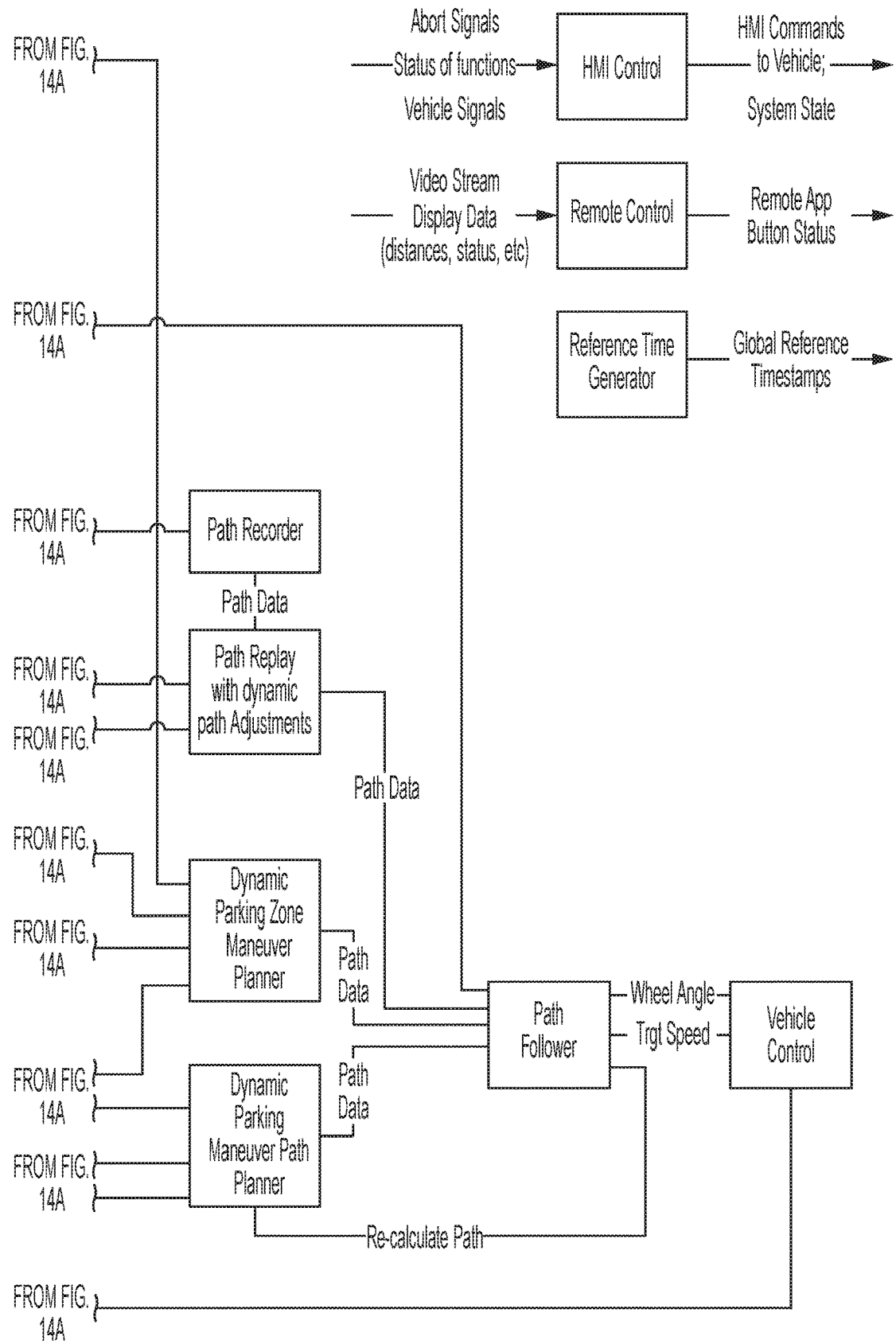

Optionally, the system may comprise simplified system architecture as shown in FIG. 14. Additional signals/data flows may be required, and the system may utilize a sensor fusion map generation in CarPC or the like, and path planning in Microautobox (MAB) or the like.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize aspects of the parking assist systems described in U.S. Pat. No. 8,874,317 and/or U.S. Publication Nos. US-2017-0050672; US-2017-0017848; US-2017-0015312 and/or US-2015-0344028, and/or U.S. provisional applications, Ser. No. 62/335,248, filed May 12, 2016, and/or Ser. No. 62/330,558, filed May 2, 2016, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular parking system, the vehicular parking system comprising:
   a plurality of exterior viewing cameras mounted to a vehicle, each camera of the plurality of exterior viewing cameras having a respective field of view exterior of the vehicle;
   at least one receiver disposed at the vehicle for wirelessly receiving signals from short range communication devices near the vehicle;
   a controller comprising an image processor operable to process image data captured by the cameras;
   wherein the controller, when the vehicle is located at an entrance of a parking structure, controls the vehicle to autonomously drive the vehicle from the entrance of the parking structure toward a parking location in the parking structure;
   wherein the parking structure comprises a positioning system having a plurality of short range communication devices that generate short range communication signals, and wherein individual short range communication devices of the plurality of short range communication devices are at known locations at the parking structure;
   wherein the controller, with the vehicle at the parking structure, and responsive to short range communication signals generated by the short range communication devices of the positioning system of the parking structure and wirelessly received by the at least one receiver, determines the location of the vehicle relative to the known locations;
   wherein the controller determines the location of the vehicle relative to the known locations via comparing measured signal patterns of wirelessly received signals with previously measured signal patterns of wirelessly received signals as the vehicle moves toward the parking location in the parking structure, and wherein the previously measured signal patterns were measured by the vehicular parking system during a previous navigation of the parking structure by the vehicle;
   wherein, responsive to determining the location of the vehicle based on the comparison of the measured signal patterns of the signals generated by the short range communication devices of the positioning system of the parking structure and wirelessly received by the at least one receiver, and responsive to processing by the image processor of image data captured by at least some of the cameras, the controller drives the vehicle from the entrance of the parking structure toward the parking location in the parking structure; and
   wherein the controller, with the vehicle positioned at the parking location, and responsive at least to image processing by the image processor of image data captured by at least one of the plurality of exterior viewing cameras, parks the vehicle in the parking location.

2. The vehicular parking system of claim 1, wherein the plurality of short range communication devices generate short range communication signals in accordance with a BLUETOOTH® communication protocol.

3. The vehicular parking system of claim 1, wherein the plurality of short range communication devices generate short range communication signals in accordance with a Wireless Local Area Network (WLAN) communication protocol.

4. The vehicular parking system of claim 1, wherein the vehicular parking system is operable to determine, at least via image processing by the image processor of image data captured by at least some of the cameras, the presence of an object in the path of travel of the vehicle and, responsive to determination of the object, the controller stops or pauses the vehicle as the vehicle is driven from the entrance of the parking structure toward the parking location in the parking structure.

5. The vehicular parking system of claim 4, wherein, responsive at least to processing by the image processor of captured image data while the controller stops or pauses the vehicle, the vehicular parking system determines the absence of the object in the path of travel and, responsive to determination of the absence of the object, the controller resumes autonomously driving the vehicle.

6. The vehicular parking system of claim 4, wherein, after the driving of the vehicle is stopped or paused by the controller, the controller, responsive at least to image processing by the image processor of image data captured by at least some of the cameras, drives the vehicle to avoid the determined object.

7. The vehicular parking system of claim 1, wherein the controller controls the vehicle to autonomously drive the vehicle from a driver drop off location to the entrance of the parking structure responsive at least to image processing by the image processor of image data captured by at least some of the cameras.

8. The vehicular parking system of claim 7, wherein the controller controls the vehicle to autonomously drive the vehicle from the driver drop off location to the entrance of the parking structure responsive at least in part to a plurality of non-imaging sensors of the vehicle.

9. The vehicular parking system of claim 7, wherein the vehicular parking system learns a path of travel from the driver drop off location to the entrance of the parking structure, and wherein the vehicular parking system learns the path of travel during a learning maneuver that comprises the driver driving the vehicle from the driver drop off location to the entrance of the parking structure, and wherein, during the learning maneuver, the vehicular parking system learns the path of travel responsive to processing by the image processor of image data captured by at least one of the plurality of exterior viewing cameras.

10. The vehicular parking system of claim 9, wherein the vehicular parking system learns the path of travel from the driver drop off location to the entrance of the parking structure responsive to a user input that, when actuated by a user when the vehicle is at the driver drop off location, actuates a learning function of the vehicular parking system.

11. The vehicular parking system of claim 9, wherein the vehicular parking system learns a path of travel from the driver drop off location to the parking location in the parking structure.

12. The vehicular parking system of claim 11, wherein the controller, after the vehicular parking system learns the path of travel and responsive to actuation of a user input when the vehicle is at the driver drop off location, autonomously drives the vehicle from the driver drop off location to the parking location.

13. The vehicular parking system of claim 9, wherein the controller, after the vehicular parking system learns the path of travel and responsive to actuation of a user input when the vehicle is at the driver drop off location, autonomously drives the vehicle from the driver drop off location to the entrance of the parking structure.

14. The vehicular parking system of claim 13, wherein, responsive at least to processing by the image processor of captured image data while the controller autonomously drives the vehicle from the driver drop off location to the entrance of the parking structure, the vehicular parking system determines the presence of an object in the path of travel and, responsive to determination of the object, the controller adjusts the learned path of travel to avoid the object and the controller autonomously drives the vehicle along the adjusted learned path of travel.

15. The vehicular parking system of claim 9, wherein the driver drop off location is at or near an entrance of a home.

16. The vehicular parking system of claim 1, wherein the vehicular parking system is operable at least responsive to a remote control device, whereby a user controls steering and braking of the vehicle via the remote control device remote from the vehicle.

17. A vehicular parking system, the vehicular parking system comprising:
- a plurality of exterior viewing cameras mounted to a vehicle, each camera of the plurality of exterior viewing cameras having a respective field of view exterior of the vehicle;
- at least one receiver disposed at the vehicle for wirelessly receiving signals from short range communication devices near the vehicle;
- a controller comprising an image processor operable to process image data captured by the cameras;
- wherein the controller controls the vehicle to autonomously drive the vehicle from a driver drop off location to an entrance of a parking structure responsive at least to image processing by the image processor of image data captured by at least some of the cameras;
- wherein the controller, when the vehicle is located at the entrance of the parking structure, controls the vehicle to autonomously drive the vehicle from the entrance of the parking structure toward a parking location in the parking structure;
- wherein the parking structure comprises a positioning system having a plurality of short range communication devices that generate short range communication signals, and wherein individual short range communication devices of the plurality of short range communication devices are at known locations at the parking structure;
- wherein the plurality of short range communication devices generate short range communication signals in accordance with one selected from the group consisting of (i) a BLUETOOTH® communication protocol and (ii) a Wireless Local Area Network (WLAN) communication protocol;
- wherein the controller, with the vehicle at the parking structure, and responsive to short range communication signals generated by the short range communication devices of the positioning system of the parking structure and wirelessly received by the at least one receiver, determines the location of the vehicle relative to the known locations;
- wherein the controller determines the location of the vehicle relative to the known locations via comparing measured signal patterns of wirelessly received signals with previously measured signal patterns of wirelessly received signals as the vehicle moves toward the parking location in the parking structure, and wherein the previously measured signal patterns were measured by the vehicular parking system during a previous navigation of the parking structure by the vehicle;
- wherein, responsive to determining the location of the vehicle based on the comparison of the measured signal patterns of the signals generated by the short range communication devices of the positioning system of the parking structure and wirelessly received by the at least one receiver, and responsive to processing by the image processor of image data captured by at least some of the cameras, the controller drives the vehicle from the entrance of the parking structure toward the parking location in the parking structure; and
- wherein the controller, with the vehicle positioned at the parking location, and responsive at least to image processing by the image processor of image data captured by at least one of the plurality of exterior viewing cameras, parks the vehicle in the parking location.

18. The vehicular parking system of claim 17, wherein the controller controls the vehicle to autonomously drive the vehicle from the driver drop off location to the entrance of the parking structure responsive at least in part to a plurality of non-imaging sensors of the vehicle.

19. The vehicular parking system of claim 17, wherein the vehicular parking system learns a path of travel from the driver drop off location to the entrance of the parking structure, and wherein the vehicular parking system learns the path of travel during a learning maneuver that comprises the driver driving the vehicle from the driver drop off location to the entrance of the parking structure, and wherein, during the learning maneuver, the vehicular parking system learns the path of travel responsive to processing by the image processor of image data captured by at least one of the plurality of exterior viewing cameras.

20. A vehicular parking system, the vehicular parking system comprising:
- a plurality of exterior viewing cameras mounted to a vehicle, each camera of the plurality of exterior viewing cameras having a respective field of view exterior of the vehicle;
- at least one receiver disposed at the vehicle for wirelessly receiving signals from short range communication devices near the vehicle;

a controller comprising an image processor operable to process image data captured by the cameras;

wherein the controller, when the vehicle is located at an entrance of a parking structure, controls the vehicle to autonomously drive the vehicle from the entrance of the parking structure toward a parking location in the parking structure;

wherein the parking structure comprises a positioning system having a plurality of short range communication devices that generate short range communication signals, and wherein individual short range communication devices of the plurality of short range communication devices are at known locations at the parking structure;

wherein the plurality of short range communication devices generate short range communication signals in accordance with one selected from the group consisting of (i) a BLUETOOTH® communication protocol and (ii) a Wireless Local Area Network (WLAN) communication protocol;

wherein the controller, with the vehicle at the parking structure, and responsive to short range communication signals generated by the short range communication devices of the positioning system of the parking structure and wirelessly received by the at least one receiver, determines the location of the vehicle relative to the known locations;

wherein the controller determines the location of the vehicle relative to the known locations via comparing measured signal patterns of wirelessly received signals with previously measured signal patterns of wirelessly received signals as the vehicle moves toward the parking location in the parking structure, and wherein the previously measured signal patterns were measured by the vehicular parking system during a previous navigation of the parking structure by the vehicle;

wherein, responsive to determining the location of the vehicle based on the comparison of the measured signal patterns of the signals generated by the short range communication devices of the positioning system of the parking structure and wirelessly received by the at least one receiver, and responsive to processing by the image processor of image data captured by at least some of the cameras, the controller drives the vehicle from the entrance of the parking structure toward the parking location in the parking structure;

wherein, as the vehicle is being driven by the controller from the entrance of the parking structure toward the parking location in the parking structure, the vehicular parking system determines, at least via image processing by the image processor of image data captured by at least some of the cameras, the presence of an object in the path of travel of the vehicle and, responsive to determination of the object, the controller stops or pauses driving of the vehicle; and wherein the controller, with the vehicle positioned at the parking location, and responsive at least to image processing by the image processor of image data captured by at least one of the plurality of exterior viewing cameras, parks the vehicle in the parking location.

21. The vehicular parking system of claim 20, wherein, after the driving of the vehicle is stopped or paused by the controller, the controller, responsive at least to image processing by the image processor of image data captured by at least some of the cameras, drives the vehicle to avoid the determined object.

22. The vehicular parking system of claim 20, wherein, with the driving of the vehicle being stopped or paused by the controller, and responsive at least to processing by the image processor of captured image data, the vehicular parking system determines the absence of the determined object in the path of travel and, responsive to determination of the absence of the object, the controller resumes driving the vehicle responsive to the signals generated by the short range communication devices of the positioning system of the parking structure and wirelessly received by the at least one receiver and responsive to processing by the image processor of image data captured by at least some of the cameras.

* * * * *